Sept. 5, 1967 K. L. DIEHL 3,339,416
GAUGE DRIVE SYSTEM
Filed April 7, 1965 3 Sheets-Sheet 1

Inventor
Karl L. Diehl
By Pendleton, Neuman
Seibold & Williams
Attorneys

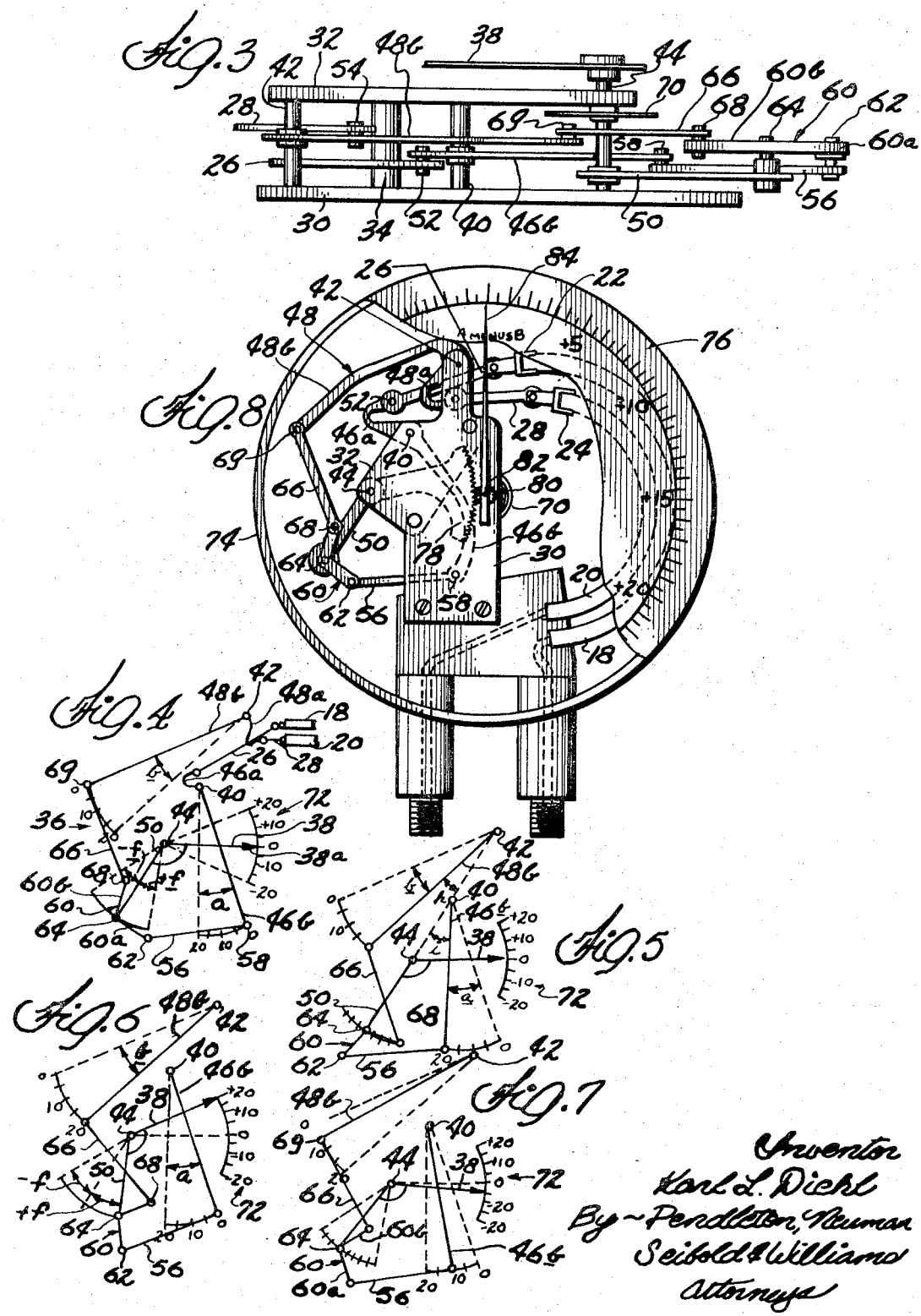

Sept. 5, 1967  K. L. DIEHL  3,339,416
GAUGE DRIVE SYSTEM

Filed April 7, 1965  3 Sheets-Sheet 3

Inventor
Karl L. Diehl
By Pendleton, Neuman,
Seibold & Williams
Attorneys 3,339,416
GAUGE DRIVE SYSTEM
Karl L. Diehl, Chicago, Ill., assignor to Colorado Oil and Gas Corporation, Denver, Colo., a corporation of Delaware
Filed Apr. 7, 1965, Ser. No. 446,322
14 Claims. (Cl. 73—412)

This invention relates to improvements in gauges and drive linkages adapted for use in gauges, and more particularly to an improved linkage drive in compact differential gauges.

As used herein, the term differential gauge is intended to refer to gauges having at least two sensing elements, each of which produces motion in response to variations in the condition being sensed, such as temperature or pressure, and including drive mechanism for operating an indicator in response to movement of the two sensing devices to provide an indication of the difference between the variables sensed by the two sensing elements. In one illustrative form this may be a pressure gauge having two Bourdon tubes with a linkage drive system connecting these two tubes to a single indicator whereby the indicator provides a visual indication of the difference between the pressures sensed by the two Bourdon tubes. It has previously been known to utilize differential linkage drive systems in such devices, see for instance McElroy U.S. Patent No. 519,921. The present invention is directed to improvements in such gauges and in drives for such gauges, and more specifically to improved compact differential gauges and economical drive linkages therefor providing relatively large arcs of indicator movement.

A desirable gauge of the type to which this invention is directed should be compact in internal design to provide a small gauge for space saving purposes. In many installations where such gauges are used, panel space is at a premium, and consequently compactness of the gauges is highly desirable and sometimes critical. However, the gauge and drive systems should also be economical to produce and must provide accurate response. This response should be in terms of a large angle of indicator movement to facilitate read-out of the values being indicated by the system by convenient visual inspection. The drive systems of such gauges should be of a design which is flexible and adaptable for use in various physical arrangements, as in gauges of various types with different styles of indicators, and adaptable to receive inputs from sensing mechanism in various positions. At the same time the indicator response provided by the system should be as near linear as possible with respect to the sensing element input to provide uniform accuracy and ease of reading over the entire indicator range.

Accordingly, it is an object of this invention to provide an improved gauge construction which meets or contributes to obtaining the desirable characteristics outlined above.

It is an object of this invention to provide an improved differential gauge.

It is another object of this invention to provide an improved differential pressure gauge of compact design.

It is another object of this invention to provide an improved linkage drive system for differential gauges.

It is another object of this invention to provide an improved linkage drive system providing accurate, near linear response, with a large arc of indicator movement, and which is simple and economical to produce.

These and other objects and advantages of this invention will appear to those skilled in the art from the description, accompanying drawings and appended claims.

In carrying out this invention in one illustrative form, a differential pressure gauge is provided including first and second Bourdon tubes disposed generally at one side of the gauge housing with the second tube internested within the curve of the first tube, an indicator, and a drive linkage responsive to movement of the Bourdon tubes to drive said indicator in accordance with the differential movement between the distal ends of said tubes. The drive linkage comprises a first link drive connected to the indicator and supported for pivotal movement about a first axis fixed relative to the gauge, a differential link pivotally mounted on said first link at a point spaced from said first axis and having two angularly disposed end portions extending from the point of pivotal connection of the differential link to said first link. A first linkage is connected to the distal end of the first Bourdon tube and to the first end portion of the differential link, and a second linkage is connected to the distal end of the second Bourdon tube and to the second end portion of the differential link. The first and second linkages extend from the differential link, on opposite sides of said first axis, to fixed axes spaced from said first axis on the side thereof generally opposite the direction of extension of said first link from said first axis whereby said differential drive linkage is disposed around said first axis. Each of said first and second linkages includes a drive link and a connecting link pivotally connected to said drive link and to the respective end portion of the differential link, and each of the drive links extends generally parallel to the respective end portion of the differential link and each of said connecting links extends generally normal to the respective connected drive link and end portion when the respective sensing element is at the midpoint of its range of operating movement.

For a more complete understanding of this invention, reference should now be made to the drawings, wherein:

FIG. 3 is an elevation view of the gauge of FIG. 1 looking substantially in the direction of the arrows 3—3 in FIG. 1;

FIGS. 4, 5, 6 and 7 are schematic views of the drive linkage and indicator of the gauge in FIG. 1 in various positions;

FIG. 8 is a front elevation view of another gauge employing teachings of this invention, with part of the front cover broken away;

Figure 1:
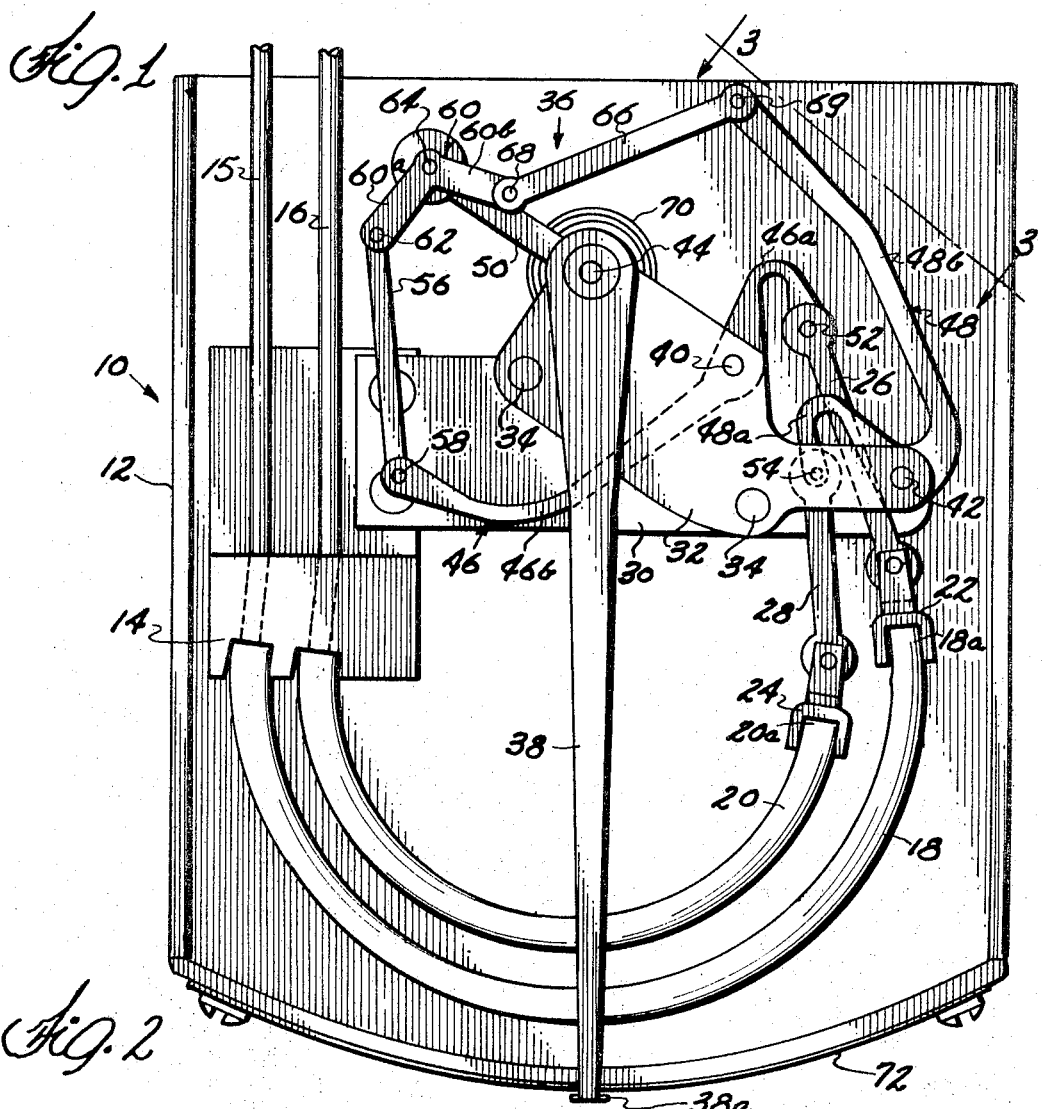
FIG. 1 is a top plan view of a differential pressure gauge employing teachings of this invention, with the cover of the gauge removed.
Figure 2:
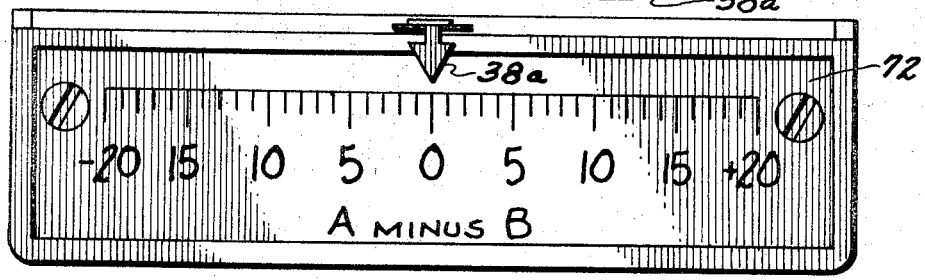
FIG. 2 is a front elevation view of the gauge of FIG. 1.

Referring now to the drawings, and particularly to FIGS. 1–3, 10 indicates generally a differential pressure gauge of the Bourdon tube type. This gauge includes a tray-shaped housing 12 in which is mounted a socket 14 connected to two input conduits 15 and 16 adapted to be connected to pressure systems, the pressures of which are to be sensed by the gauge 10. Bourdon tubes 18 and 20 have pressures-tight connections to the block 14 and are in communication with conduits 15 and 16 respectively, as illustrated. The tubes 18 and 20 are closed at their free ends 18a and 20a by endpieces 22 and 24, these endpieces being pivotally connected to links 26 and 28.

A bottom support plate 30 is fastened to socket 14, and a top plate 32 is secured to the plate 30 by means of spacers 34. The plates 30 and 32 carry the linkage drive system indicated generally by the number 36, and the indicator 38.

Three arbors, designated by numerals 40, 42 and 44 are pivotally mounted between plates 30 and 32 and support the movable links of the drive system 36 as well as the movable indicator 38. The axes of rotation of the respective arbors will be referred to hereinafter by the same numeral designations as the respective arbors, as these serve as the axes of rotation of the various elements of the drive system. A lever 46 is pivotally mounted on arbor 40; a lever 48 is pivotally mounted on arbor 42, and a drive lever 50 is pivotally mounted on arbor 44 and is secured to the pointer 38 which is also pivotally mounted on arbor 44 to move in accordance with the rotation of lever 50 about the axis of arbor 44. Lever 46 includes a relatively short gooseneck portion 46a extending from arbor 40 and pivotally joined to connecting link 26 by a pin 52. Similarly, link 48 includes a gooseneck section 48a extending from arbor 42 and pivotally joined to connecting link 28 by a pin 54. These gooseneck sections are adjustable elements and permit convenient adjustment of the linkage system to compensate for the inherent variations in individual Bourdon tubes by bending of the gooseneck portions to change the effective lever arms between the respective arbors 40 and 42 and the points of pivotal connection of the tube endpieces 22 and 24 to the links 26 and 28. Other known adjustable elements such as slotted links may be utilized. Levers 46 and 48 also include elongated portions 46b and 48b respectively, which may be of arcuate or angular configuration as illustrated to avoid obstruction of their movement by the spacers and/or arbors in operation of the linkage.

A connecting link 56 has one end pivotally joined to the distal end of lever 46 by a pin 58, and the opposite end is pivotally joined to one end portion 60a of a bell crank differential link 60 by a pin 62. Lever 60 is pivotally mounted on the free distal end of link 50 by pin 64. The opposite end portion 60b of lever 60 is pivotally joined to one end of a second connecting link 66 by pin 68, and the opposite end of link 66 is pivotally joined to the remote end of link 48 by pin 69. The drive linkage from tube 18 to lever 60, including links 46 and 56, extends around one side of arbor 44, while the linkage from tube 20 to lever 60, including links 48 and 66 extends around the opposite side of arbor 44. This arrangement, together with the internested disposition of tubes 18 and 20 made possible by the present invention, results in a compact arrangement of the two Bourdon tubes and the linkage drive system to permit enclosure of the mechanism in a small housing. It will be noted that the arbors 40 and 42, together with the connecting links 46a and 48a are arranged in such a way that with increasing pressure in the Bourdon tubes, the levers 46 and 48 rotate in opposite directions. However, the arrangement of links 56, 60 and 66 converts these opposite motions into rotation of bell crank 60 in one direction about the pivot axis at 64, all as will be explained further below.

For eliminating inaccuracy caused by backlash at the numerous pivot points, a hair spring 70 is provided with one end secured to arbor 44 and the opposite end secured to one of the spacers 34. This biases the indicator and the entire linkage mechanism in one direction.

A suitably calibrated scale 72 (FIG. 2) is mounted on the front of housing 12 for registry with the tip 38a of the indicator 38.

From the standpoint of kinematics, the drive system 36 described above consists of two 5-bar linkages having bar 50 in common. One linkage, responsive to the movement of tube 18, comprises lever 46, link 56, one end portion 60a of the lever 60, link 50, and a fixed "link" extending from the axis of arbor 44 to the axis of arbor 40. The other 5-bar linkage, responsive to the movement of tube 20, includes lever 48, link 66, the other end portion 60b of bell crank lever 60, lever 50 and the fixed "link" extending from the axis of arbor 44 to the axis of arbor 42. The operation of this system will be illustrated with reference to the schematic diagrams of FIGS. 4, 5, 6 and 7, wherein the respective levers and links are illustrated by their straight-line equivalents bearing the same numbers. Indicia have been included adjacent movable pivot points 58, 64 and 69, and the end positions of the operative range of movement of the links 46b, 48b and 50 are shown in dashed lines. For purposes of this description it will be assumed that the gauge is adapted to function over a pressure range of from 0 to 20 p.s.i. in each of the two Bourdon tubes 18 and 20. However, it will be appreciated that this is for purposes of illustration only as the invention may be utilized over other pressure ranges or in measuring other values such as temperature. Alternatively, by providing appropriate stop pegs for the linkage, gauges utilizing teachings of this invention may be utilized to indicate differential pressures only within a preselected portion of the pressure applied to the Bourdon tubes, e.g. several pressure units each side of the normal operating pressures of the systems.

FIG. 4 illustrates the position of a drive linkage 36 with no input pressure to either Bourdon tube and corresponds to the drive linkage as illustrated in FIG. 1. Since the input to each Bourdon tube is zero, the levers 46 and 48 and hence the links 46b and 48b are in their end positions as illustrated, with the floating pivot point 64 and thus the lever 50 and indicator 38 in their central or zero positions. The links 46a and 48a are adjusted with respect to the characteristics of the individual tubes 18 and 20 and the lengths of links 46b and 48b to provide amplification factors which result in substantially equal incremental movement of the distal ends of links 46b and 48b with equal pressure changes in each tube 18 and 20. Thus as both input pressures increase, the angular position of links 46b and 48b increase, from the zero positions, proportionately at the same increment rate whereby the differential link 60 rotates about pivot point 64 but without translational movement of this pivot point, whereby the link 50 and hence the indicator 38 remain in their zero positions. This is illustrated further in FIG. 5 wherein it is assumed that the input pressure to each Bourdon tube is increased to 20 p.s.i., thus maintaining zero pressure differential. It will be observed that the levers 46 and 48 have moved through their respective working angles $a$ and $b$. The pivot points 62 and 68 have moved to different angular positions relative to the pivot point 64. However, the pivot point 64 and the lever 50, together with the indicator 38 remain at their zero positions indicating the zero pressure differential.

In all cases where one input pressure varies from the other, the position of the pivot point 64 and thus the link 50 and indicator 38 deviate from the zero position either in a positive or negative direction. This is illustrated in FIGS. 6 and 7. In FIG. 6 the input pressure to tube 20 (link 48b) is 20 p.s.i. and the input to tube 18 (link 46b) is zero. Thus the differential pressure is 20 p.s.i. as is indicated by the system due to lever 48 being moved through its maximum working angle $b$ and the lever 46 remaining at its zero position. With reference to the zero position of FIG. 4, this results in pivotal motion of the link 60 about pivot connection 62, and translational movement of pivot point 64 along an arc about pivot axis 44 having a radius corresponding to the length of link 50. Thus the floating pivot point 64 moves in a positive direction, and link 50 and the indicator 38 are moved through an indicator angle $+f$ corresponding to $+20$ p.s.i. on the scale 72. FIG. 7 illustrates another example, wherein it is assumed that the input pressure to the tube 20 is 5 p.s.i. and the input to tube 18 is 10 p.s.i. These values are reflected by movement of link 48b through an angle corresponding to $5/20$ of angle $a$ or $1/4$ $a$ and movement of the lever 46b through an angle of $10/20$ $b$ or $1/2$ $b$ as illustrated in FIG. 7. The net result of such movements of levers 46 and 48 is that pivot point 64 is moved through an arc of ¼ f in a negative direction to move link 50 and thus indicator 38 to a −5 p.s.i. position to indicate the −5 p.s.i. differential of the system connected to Bourdon tube 20 relative to the system connected to tube 18.

Figure 11:
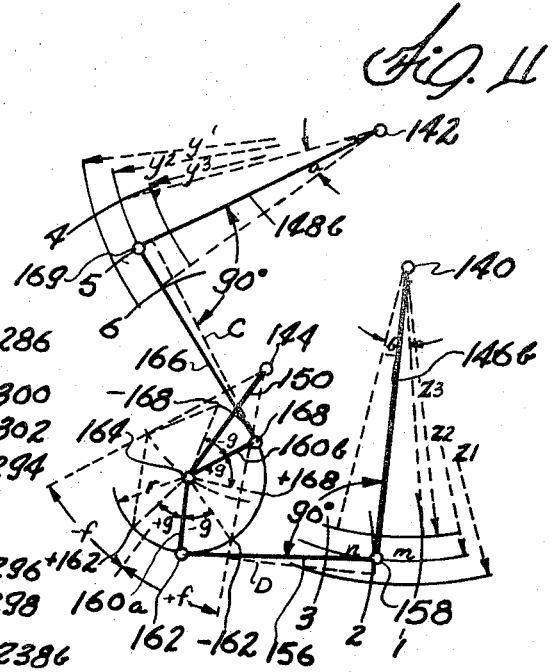
FIG. 11 is a schematic view illustrating the development of a linkage drive system employing teachings of this invention.

The operation of the aforedescribed system and certain features of the invention will be further understood with reference to the manner of development of a linkage system in accordance with the invention as will be described with reference to FIG. 11. Corresponding numerals with the prefix 1 have been utilized to identify the elements of the design layout of this figure with corresponding elements of linkage 36.

Pivot points 140 and 142, together with the mid-position location of pivot point 164 are first selected, having due regard to the intended position of the sensing elements, such as Bourdon tubes 18 and 20, and the location of pivot point 144. The position of pivot point 144, and thus the length of link 150 are also selected. These selections are determined by several factors, including the type and position of the desired indicator arrangement, and the amplification of the sensing element movements that may be desired. The relevance and consideration to be given to such factors will be more apparent upon due consideration of the steps of the design of a linkage system. However, it will be observed that these various points 140, 142, 144 and 164 may lie in a straight line, as in the system of FIG. 1, or may be triangularly disposed as illustrated in FIG. 11. Suitable lengths of the arm portions 160a and 160b of the differential link 160 and the lengths of connecting links 156 and 166 are also selected. These lengths have little effect upon the amplification of the system but are determined primarily by practical factors such as space available and avoidance of toggle positions, e.g. dead-center, aligned positions of the connected links. To this end, links 156 and 166 should be substantially greater in length than the arm portions of differential link 160.

Two parallel lines spaced apart a length corresponding to the length of link 156 are then drawn through pivot points 140 and 164. The intersection of the line through point 164 with a circle centered at 164 and having a radius corresponding to the length of the arm portion 160a determines the mid-position of pivot point 162 and thus of arm portion 160a as illustrated. The portion of the parallel line extending from point 140 to its intersection with a line perpendicular thereto and passing through point 162, as indicated by line D, provides a close approximation of the length and mid-position of link 146b. The mid-position of pivot point 168 and thus arm portion 160b, as well as an approximation of the length and mid-position of link 148b are similarly determined; note line C.

An angle g is then selected considering the radius r (length of the arm portions of differential link 160) and the approximate available motion at the ends of links 146b and 148b. This angle g is drawn in as indicated by +g and −g at each side of the radii from 164 to points 162 and 168 to determine the points indicated by +162, −162, +168 and −168. These comprise the approximate end points of movement of the linkage assuming that the sensing elements move together from their zero to their maximum positions. Arcs 1, 2 and 3 are then drawn, each with a radius corresponding to the length of link 156 and centered at −162, 162 and +162, respectively. Similarly, arcs 4, 5 and 6 of a radius corresponding to the length of link 166 are drawn about the positions −168, 168 and +168, respectively. Subsequently a series of circular arcs centered at pivot axis 140 and having varying radii, as at $z_1$, $z_2$ and $z_3$ are drawn to intersect the arcs 1, 2 and 3. By trial and error the arc z is selected which is divided by the arcs 1, 2 and 3 into equal sections m and n. Similar arcs $y_1$, $y_2$ and $y_3$ are drawn about pivot axis 142, and by trial and error the arc y is selected which is divided by the arcs 4, 5 and 6 into equal sections. The arcs z and y thus selected represent the length of links 146b and 148b respectively, and the points of intersection of these arcs z and y with arcs 2 and 5 are the mid-positions of pivot points 158 and 169 and thus determine the mid-positions of links 146b and 148b, respectively.

To determine the angles +f and −f of the indicator link 50, the system is then drawn with link 146b in its zero position and link 148b in its maximum position, and then with link 148b in its zero position and link 146b in its maximum position. The linkage system should also be checked from a practical point of view regarding available space, working angles, and toggle positions. If angle +f is not equal to −f, the length of link 56 or 66 may be changed in another trial design of the system.

Several facets of the linkage system and its design should now be apparent. Notably it will be found that the final mid-positions of links 146b and 148b determined in accordance with the aforedescribed procedure will be near the original lines drawn parallel to the links 160a and 160b in their mid-positions. Thus, the finally determined links 146b and 148b are substantially parallel to the links 160a and 160b, and the links 156 and 166 extend substantially normal to the respective drive links 146b and 148b and to the respective end portions 160a and 160b when the drive links 146b and 148b are in their mid-positions. This desirable geometrical relationship is made possible within a highly flexible design by utilizing the angular differential link which results from the afore-described design procedure. The resulting linkage provides substantial tangential movement of links 156 and 166 with respect to the ends of the connected drive links 146b and 148b and end portions 160a and 160b through the central or mid-portion of the range of movement of the system. Further movement of either of the links 146b or 148b to its end position results in the same angular movement of the differential link 160 about its pivot point 164, whereby movement of lever 148b through an angle a, as by a Bourdon tube, provides the same movement of the differential link 150 as is obtained by movement of the link 146b through angle b by another Bourdon tube. These factors contribute to obtaining near linearity of motion of the indicator in response to inputs from the two sensing elements and to accuracy of the measurement.

It should now be apparent that selection of the positions represented by the pivot axes 140, 142 and 164 is substantially determinative of the final lengths of links 146b and 148b. Thus the selection of these pivot points together with the selection of the length of link 150 determines the motion amplification obtained with this linkage system. Further, selecting points 140 and 142 on one side of the pivot axis 144, generally opposite the movable pivot axis 164, and with the linkage systems 146b–156–160a and 148b–166–160b extending around opposite sides of the fixed axis 144 permits selecting points 140 and 142 in appropriate adjacent positions to be driven by two internested Bourdon tubes as in FIG. 1, while providing high amplification of the movement of the Bourdon tubes. The result is a highly flexible design, and yet a very compact system which may be placed in relatively small housings.

By way of one specific illustration, a tray type gauge as illustrated in FIG. 1 was provided with elements having the following dimensions: angle $a=19°$; angle $b=16°$; angle $f=21°$; angle h (see FIG. 5; the angle between the maximum position of link 48b and the line through the points 40, 42 and 44)$=17°$; angle i (see FIG. 5; the angle between the maximum position of link 46b and the abovenoted line)$=33°$; the distance between 42 and 40$=0.734''$; the distance between 40 and 44$=0.640''$; the effective length of link 46b$=1.296''$; the effective length of link 48b$=1.536''$; the effective length of each of links c and d$=0.906''$; the effective length of link 50$=0.718''$; the effective length of each end portion of differential link 60=0.312", and the included angle between the two end portions of differential link 60=106°. The nominal length of each of the adjustable links 46a and 48a was 0.250" whereby the amplification ratio of lever 46 (for Bourdon tube 18) was 5.18:1 and the ratio for lever 48 (Bourdon tube 20) was 6.14:1. This system provided an arc of movement of the link 50 and thus of the indicator 38, of about 45°, i.e. 22½° each side of the zero position, and was placed in a gauge housing about 3" wide, 3¾" long and 1" deep.

It will thus be appreciated that gauges and drive systems employing the teachings of this invention are capable of providing large degrees of indicator movement in a simple linkage drive mechanism. However, in the event a larger arc of indicator movement is desired, a sector gear and pinion drive mechanism may be included as is illustrated in the circular gauge of FIG. 8. This gauge includes two Bourdon tubes and a linkage drive system as has been described above with reference to FIG. 1 and as is indicated by the use of the same reference numerals in FIG. 8. However, in this gauge the elements are housed in a circular case 74 provided with a circular, indicia-bearing face plate 76. The drive lever 50 in this embodiment is drive connected to a sector gear element 78. This sector gear is in drive engagement with a pinion 80 which is secured to the pivotally mounted pointer shaft 82 carrying the indicator 84. Drive systems of this design may be utilized to obtain very large arcs of pointer movement, e.g. ±135° up to ±180°.

Figure 9:
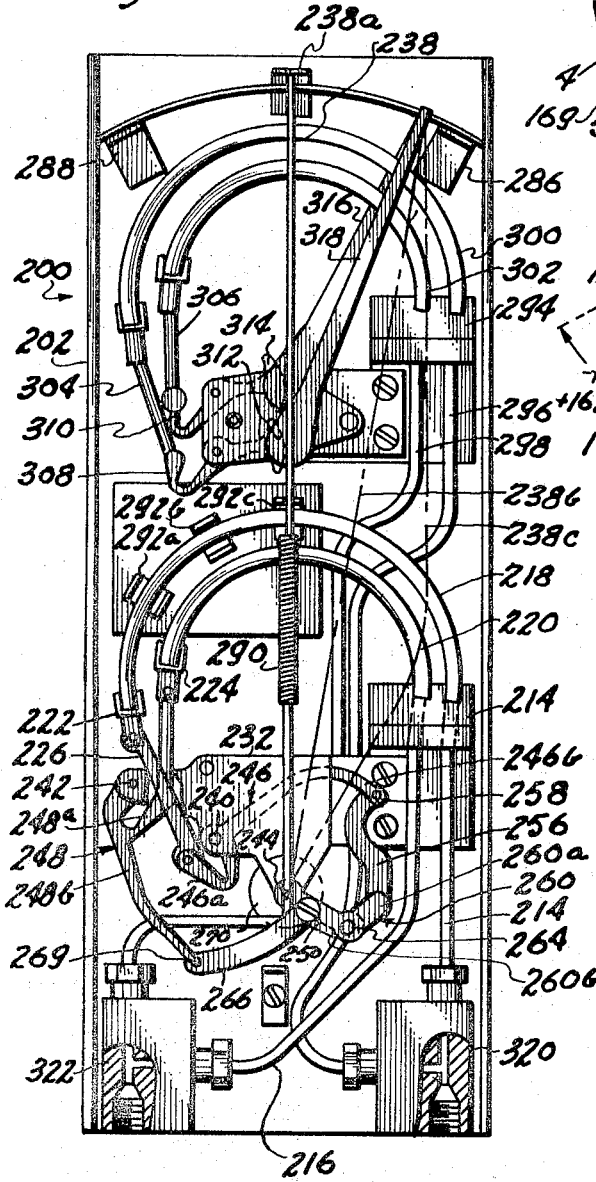
FIG. 9 is a side elevation view of another gauge employing teachings of this invention, with the side cover removed and portions of the mechanism broken away.
Figure 10:
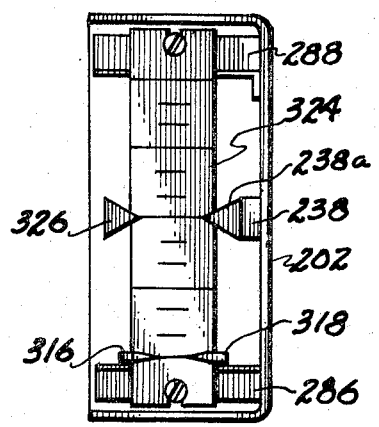
FIG. 10 is an elevation view of the indicator end of the gauge in FIG. 9.

The guage 200 illustrated in FIGS. 9 and 10 comprises a combination receiver and differential pressure gauge for use where it is desired to obtain a visual indication of whether there is positive or negative difference between two systems such as a supply and signal output in a controlling system, together with an exact reading of the pressure of each system. In such devices it is often desirable to provide a highly visible and easily readable indication of the sense of the difference between the two systems, with the exact amount being of secondary importance, and it is for such installations that the illustrated gauge 200 is particularly designed.

The gauge 200 includes a housing 202 in which is mounted a differential gauge unit comprising a pair of Bourdon tubes and a drive linkage for operating a differential indicator substantially the same as the unit illustrated in FIG. 1 and described above, as is indicated by the use of the same reference numerals with the prefix 2 for corresponding elements. However, it will be observed that the specific elements differ in some detail in accordance with the installation. For instance link 256 includes an arcuate portion to avoid a support pin, and the gooseneck or adjustable link portion 248a extends from link 248b in the area between axis 242 and pin 269. The differential indicator 238 has only a small available arc of movement within housing 202, between a pair of stops provided at 286 and 288. The indicator includes a flexible segment 290, which may be a coil spring, to allow flexing of the indicator and thus continued movement of the linkage system beyond the stop positions to avoid damage due to overstressing of the drive system; note the dashed line positions of the indicator at 238b and 238c. Further, U-shaped stops 292a, 292b and 292c are added to restrict the expansion of the Bourdon tubes 218 and 220 as protection against overpressure.

The duplex receiver section of this gauge 200 includes a socket 294 with two input conduits 296 and 298 connected thereto. Bourdon tubes 300 and 302 are in pressure tight connection to the socket 294 and are closed on the free ends by endpieces pivotally connected to links 304 and 306. These links are in turn connected through adjustable gooseneck segments 308 and 310 to geared segments 312 and 314 in drive engagement with pinions (not shown) to drive the indicators 316 and 318. To accommodate this duplex arrangement with only two external connections, the individual conduits to the duplex receiver system and to the differential system are connected by means of three-way connectors 320 and 322 as illustrated.

Referring now to FIG. 10, the indicia scale 324 of gauge 200 is calibrated for visual reading of the pressures indicated by the indicators 316 and 318 and corresponding to the pressures in Bourdon tubes 300 and 302. A large and visually prominent fixed reference indicator 326 is positioned opposite the zero pressure differential position of the indicator 238 to provide a readily readable indication of whether or not there is a pressure differential between the two systems, and, if so, the sense of the difference. A scale calibrated to the movement of indicator 238 can be provided within the limits of movement of this indicator, if desired.

While it will be obvious to those skilled in the art that various modifications of the specific embodiments shown and described herein may be made without departing from the spirit and scope of this invention, it will also be appreciated that improved drive linkage systems and improved gauges have been provided which meet or substantially meet the objects enumerated above for this invention. Particularly, a differential pressure gauge has been provided with a drive system which is highly flexible in design and which provides accurate and substantially linear readings over a wide range of indicator movement. These features and objects are obtainable in many installations with a simple, direct linkage drive, for instance as in FIG. 1, thereby providing a particularly economical system. Further, the aforementioned operating features are obtainable in devices which are of compact design, thereby facilitating the use of small gauge housings and effecting savings of space in instrument panels and the like.

While particular embodiments of this invention are shown and described above, it will be understood, of course, that the invention is not to be limited thereto, since many modifications may be made by those skilled in this art, particularly in light of the foregoing teachings. It is contemplated therefore by the appended claims, to cover any such modifications and variations as fall within the true spirit and scope of this invention.

I claim:

1. A differential indicating gauge comprising first and second sensing elements movable in response to variables being sensed thereby, an indicator, and means connecting said sensing elements to said indicator comprising a first link for driving said indicator and mounted for pivotal movement about a first axis fixed relative to said gauge, a differential link pivotally mounted on said first link at a point spaced from said first fixed axis and including first and second end portions extending in angular relation to one another from the pivotal connection of said differential link to said first link, a first linkage connected to said first sensing element and to said first end portion, a second linkage connected to said second sensing element and to said second end portion, each of said first and second linkages including a drive link and a connecting link pivotally connected to said drive link and to the respective end portion of said differential link, each of said drive links extending generally parallel to the respective end portion of said differential link and each of said connecting links extending generally normal to the respective connected drive link and end portion when the respective sensing element is at the mid-point of its range of operating movement.

2. A differential indicating gauge as in claim 1, each of said linkages including a drive lever mounted for pivotal movement about an axis fixed relative to said gauge and spaced from said first axis, each of said drive links being a part of said lever of the respective linkage, and each of said drive levers including an adjustable link element connected to the respective sensing element.

3. A differential indicating gauge as in claim 2 wherein each drive lever provides at least 2:1 amplification of the movement of the respective sensing element.

4. A differential indicating gauge as in claim 1 wherein said first link extends on one side of said first axis, and said first and second linkages extend from said differential link along opposite sides of said first axis to fixed axes spaced from said first axis on the side thereof generally opposite the direction of extension of said first link from said first axis whereby said differential drive linkage is disposed around said first axis.

5. A differential indicating gauge as in claim 1 wherein said indicator is directly connected to said first link and mounted for pivotal movement therewith about said first fixed axis.

6. A differential indicating gauge as in claim 1 wherein said first end portion extends at an obtuse angle, less than 180°, to said second end portion.

7. A differential indicating gauge as in claim 1, a pinion connected to said indicator, and said first link including a sector gear engaging said pinion.

8. A differential indicating gauge comprising a gauge housing, a first arcuate sensing element disposed in said housing adjacent one wall thereof, a second arcuate sensing element disposed in nested relation with said first element, within the arc of said first sensing element, said sensing elements being movable in response to variables being sensed thereby, an indicator mounted for pivotal movement about an axis fixed relative to said gauge and disposed on the concave side of said arcuate sensing elements, a first link for driving said indicator and mounted for pivotal movement about a first axis fixed relative to said gauge, said first axis being disposed on the concave side of said arcuate sensing elements, a differential link pivotally mounted on said first link at a point spaced from said first fixed axis and including first and second end portions extending in angular relation to one another from the pivotal connection of said differential link to said first link, a second link mounted for pivotal motion about a second axis fixed relative to said gauge and spaced from said first axis on the side thereof generally opposite said first link, a first connecting link pivotally connected to said second link at a point remote from said second fixed axis and pivotally connected to said first end portion, a third link mounted for pivotal motion about a third axis fixed relative to said gauge and spaced from said first axis generally on the same side thereof as said second fixed axis, a second connecting link pivotally connected to said third link at a point remote from said third fixed axis and pivotally connected to said second end portion, a first adjustable link member joined to said second link and having an effective length less than one-half the length of said second link, means connecting said first adjustable link to said first sensing element, a second adjustable link joined to said third link and having an effective length less than one-half the effective length of said third link, and means connecting said second adjustable link to said second sensing element.

9. A differential indicating gauge as in claim 8 wherein said second link and said first connecting link extend on one side of said first fixed axis, and said third link and said second connecting link extend on the opposite side of said first fixed axis.

10. A gauge comprising a housing, first and second means for connecting external sources of pressure to said housing, an arcuate Bourdon tube connected in communication with said first connecting means, an indicator, and drive means connecting said first Bourdon tube to said indicator, a second arcuate Bourdon tube disposed in nested relation with said first Bourdon tube and connected in communication with said second connecting means, a second indicator, and means connecting said second Bourdon tube to said second indicator, a third arcuate Bourdon tube disposed in said housing and connected in communication with said first connecting means, said third Bourdon tube having a free end, a fourth arcuate Bourdon tube disposed in nested relation with said third Bourdon tube and connected in communication with said second connecting means, said fourth Bourdon tube having a free end disposed adjacent the free end of said third Bourdon tube, a third indicator mounted for pivotal movement about an axis disposed on the concave side of said third and fourth Bourdon tubes, a first link in operative drive connection with said third indicator and mounted for pivotal motion about a first axis fixed relative to said gauge and disposed on the concave side of said third and fourth Bourdon tubes, a differential link pivotally mounted on said first link at a point spaced from said first fixed axis and including first and second end portions extending in angular relation to one another from the pivotal connection of said differential link to said first link, a first linkage including a link mounted for pivotal motion about a second axis fixed relative to said gauge and disposed in the area between said first fixed axis and the free ends of said third and fourth Bourdon tubes, said first linkage extending on one side of said first fixed axis and connected to said first end portion, a second linkage including a link mounted for pivotal movement about a third axis fixed relative to said gauge and disposed in the area between said first fixed axis and the free ends of said third and fourth Bourdon tubes, said second linkage extending on a side of said first axis opposite said first linkage and connected to said second end portion, and means connecting the free end of said third Bourdon tube to said first linkage adjacent said second fixed axis, and means connecting the free end of said fourth Bourbon tube to said second linkage adjacent said third fixed axis.

11. A gauge as in claim 10 wherein said first and second Bourdon tubes are disposed adjacent one end of said housing, said third and fourth Bourdon tubes being disposed in a portion of said housing remote from said one end, said indicators extending to said one end of said housing, and said third indicator including a flexible section.

12. A differential drive linkage comprising a first link mounted for pivotal movement about a first axis, a differential link pivotally mounted on said first link at a point spaced from said first axis and including first and second end portions extending in angular relation to one another from the pivotal connection of said differential link to said first link, a first linkage connected to said first end portion, a second linkage connected to said second end portion, each of said first and second linkages including a drive link and a connecting link pivotally connected to said drive link and to the respective end portion of said differential link, each of said drive links extending generally parallel to the respective end portion of said differential link and each of said connecting links extending generally normal to the respective connected drive link and end portion when said drive links are at the midpoints of their ranges of operating movement.

13. A differential drive linkage as in claim 12 wherein said first link extends on one side of said first axis, and said first and second linkages extend from said differential link on opposite sides of said first axis to fixed axes spaced from aid first axis on the side thereof generally opposite the direction of extension of said first link from said first axis whereby said differential drive linkage is disposed around said first axis.

14. A differential drive linkage as in claim 12 wherein said first end portion extends at an obtuse angle, less than 180°, to said second end portion.

No references cited.

LOUIS R. PRINCE, *Primary Examiner.*

D. O. WOODIEL, *Assistant Examiner.*